June 7, 1932. J. W. SHEPERDSON ET AL 1,861,554
CONTROLLING THE SHEARING OF METAL BARS WHILE IN MOTION
Filed July 19, 1927 8 Sheets-Sheet 4

June 7, 1932. J. W. SHEPERDSON ET AL 1,861,554
CONTROLLING THE SHEARING OF METAL BARS WHILE IN MOTION
Filed July 19, 1927 8 Sheets-Sheet 7
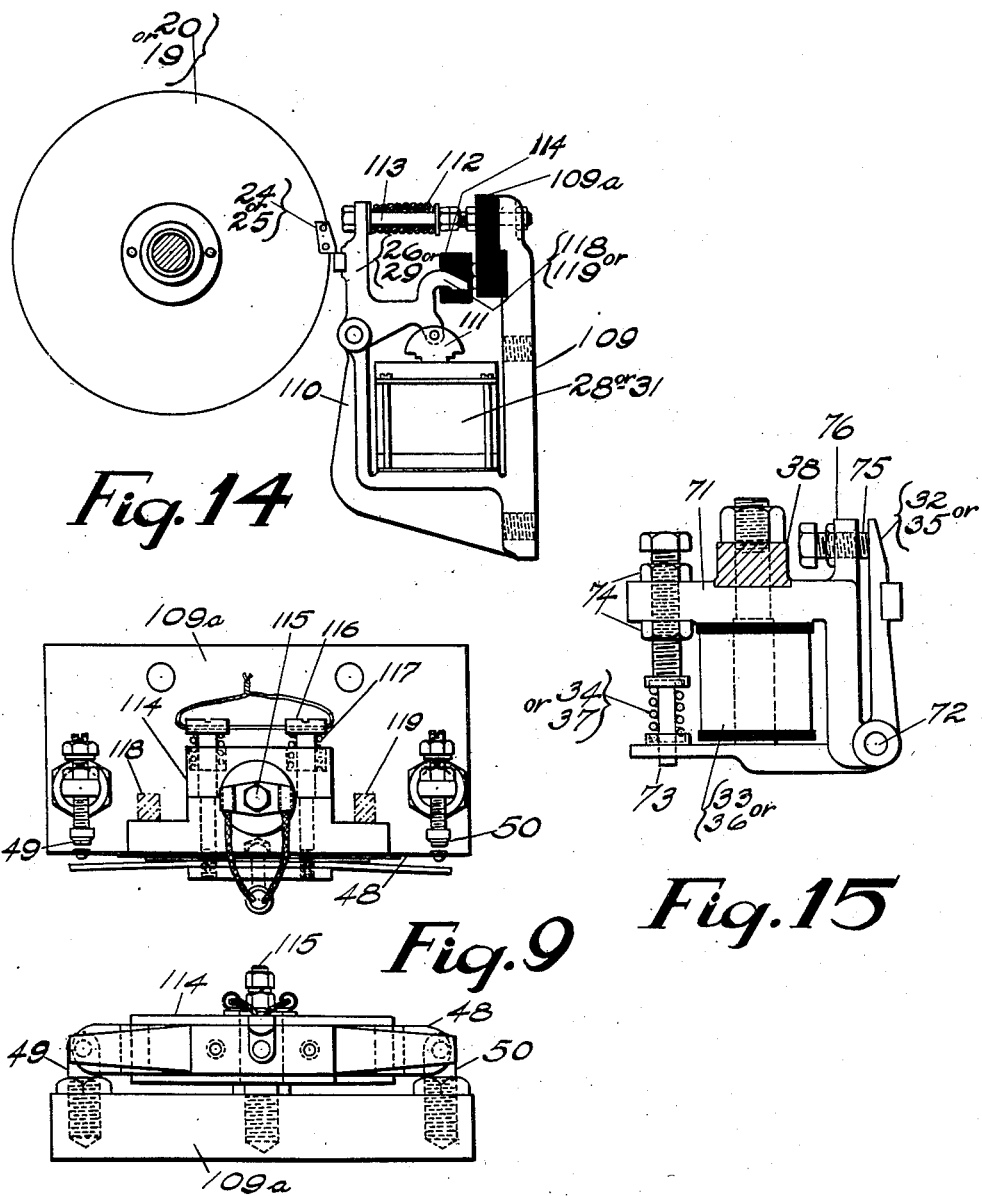

Patented June 7, 1932

1,861,554

UNITED STATES PATENT OFFICE

JOHN W. SHEPERDSON AND FRANK P. DAHLSTROM, OF WORCESTER, MASSACHUSETTS, ASSIGNORS TO MORGAN CONSTRUCTION COMPANY, OF WORCESTER, MASSACHUSETTS, A CORPORATION OF MASSACHUSETTS

CONTROLLING THE SHEARING OF METAL BARS WHILE IN MOTION

Application filed July 19, 1927. Serial No. 206,988.

This invention relates to the shearing of moving material, such for example as the elongated rolled product of a steel mill or the like, which requires to be cut up into commercial lengths as fast as it is delivered from the finishing rolls of the mill.

Cutting devices which perform their operations while moving in unison with such material, so as not to impede the latter's rapid and continuous delivery, are sometimes called "flying shears". This invention provides automatic control mechanism for a flying shear, by means of which, in the absence of any attention whatsoever from an operator, the shear will function identically on successively-arriving pieces of the moving material, to first crop their front ends and then to cut them up into equal predetermined lengths.

According to the invention, the engagement of the front end of each piece of moving stock with a flag or trigger disposed in anticipatory relation to the shear, sets in operation the control mechanism for producing the shear's initial crop cut and subsequent dividing cuts on that particular piece of stock,—provision being made for the control mechanism to automatically reset itself in the intervals between the successively-arriving pieces, so that for a given setting or adjustment of the control mechanism, the cropping and dividing cuts of the shear will be performed identically on each and every successive piece of the moving material.

To this end, the invention includes a rotary measuring mechanism whose rotation, always starting from a given angular position, is initiated in response to the stock's front-end engagement with said flag or trigger; a predetermined angular movement of said measuring mechanism from starting position produces a cutting operation of the shear for the removal of the crop or waste front end, and thereafter, with each successive revolution of said mechanism, during the travel of that particular piece of stock past said flag or trigger, the shear is operated at regular intervals, to divide said piece into equal lengths. Finally, by the release of said flag or trigger by the tail end of said piece of stock, a stop is made operative to arrest the rotation of said measuring mechanism at its initial starting point, in consequence of which, the resumption of its operation, under the influence of the next-arriving piece of stock, will always produce on the latter a front crop shear cut and subsequent dividing cuts, identical in length with the corresponding cuts on the preceding piece.

In the preferred form of the invention, said rotary measuring mechanism embodies a pair of rotary members which, following the release of one or the other of them to produce, as above described, the front crop cut of the shear, are thereafter released alternately, each by the other, for single revolutions that produce the successive dividing cuts of the shear. These alternating revolutions overlap each other appreciably, in consequence of which the rotary member whose release takes place coincidently with the last dividing shear cut on any given piece of stock, has only a relatively short angular distance to travel before it is arrested by the stop which is made operative by said stock's release of the flag or trigger; thus the resetting of said control mechanism is accomplished much more promptly and quickly than would otherwise be the case. Furthermore, this construction of the shear controlling and measuring mechanism lends itself to ready and easy adjustment, to vary over a wide range the lengths of the crop cuts and of the dividing cuts of the shear, without resort to the expedient of changing the driving gears of said mechanism for this purpose, except in the case of extremely wide variations in length. The above and other advantageous features of our invention will hereinafter more fully appear reference being had to the accompanying drawings in which—

Fig. 5 is a diagram illustrating one of the control disks.

Fig. 9 is a sectional view along the line 9—9 of Fig. 8.

Fig. 10 is a bottom view of the relay shown in Fig. 9.

Fig. 12 is a plan view of the parts shown in Fig. 11a.

Fig. 14 is a detail view showing the relation between the disks and stop levers.

Fig. 15 is an enlarged view showing the relation between disks and trip levers.

Like reference characters refer to like parts in the different figures.

Figure 1:
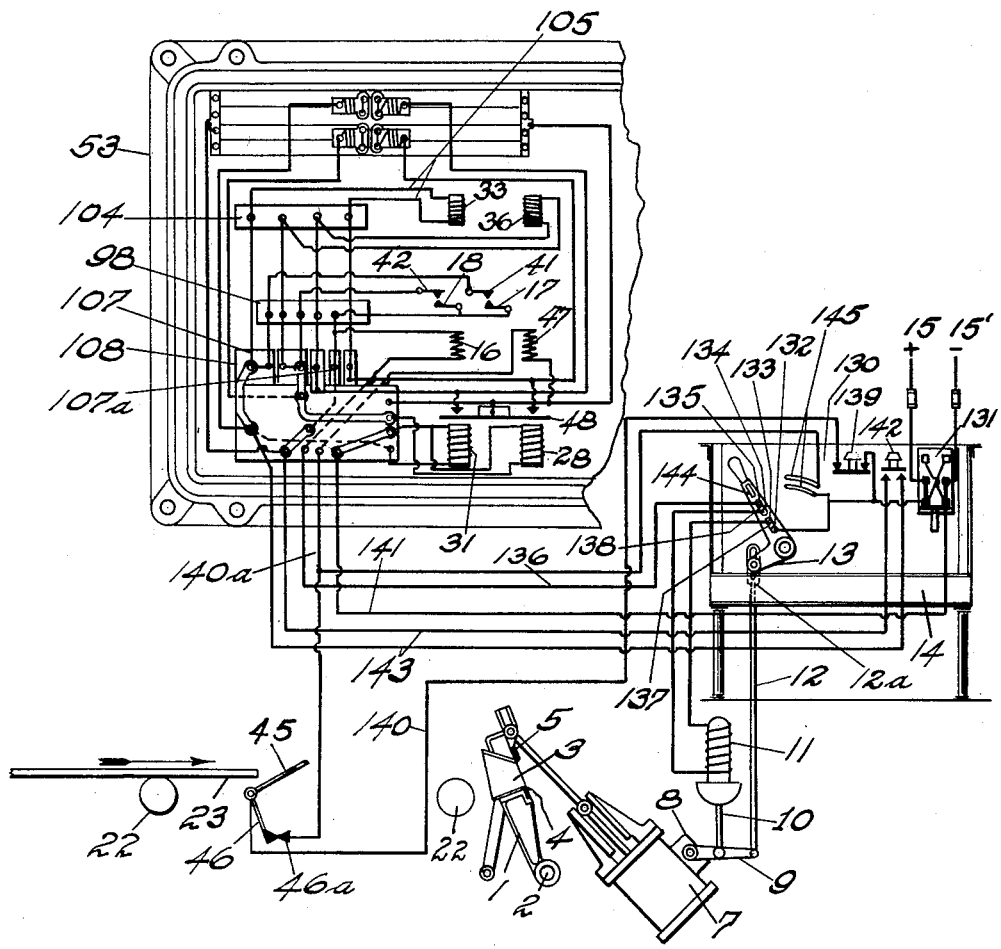
Fig. 1 is a partly diagrammatic view illustrating our invention in connection with parts of a flying shear and showing generally the relation between the various parts of the control apparatus.
Figure 2:
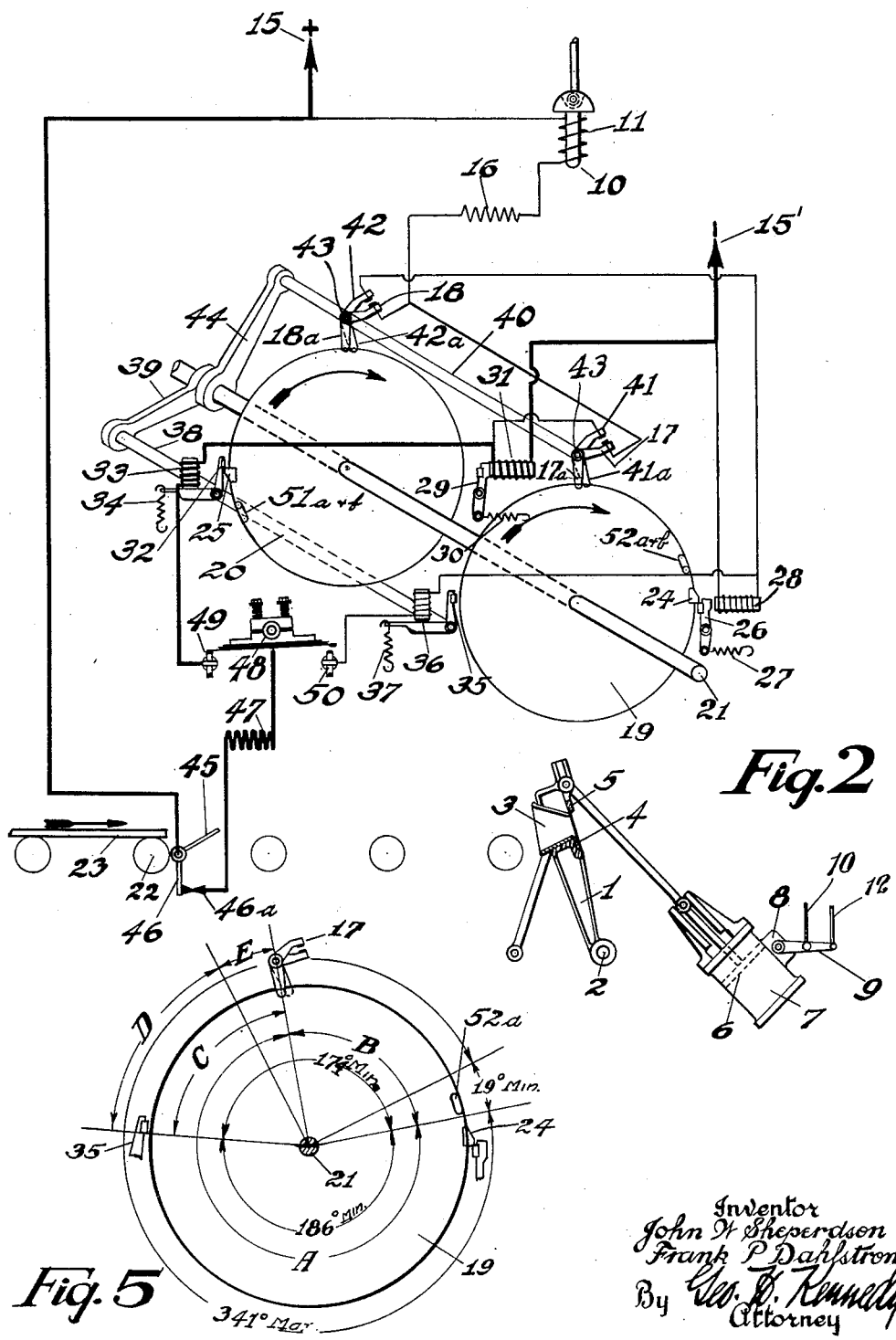
Fig. 2 is a schematic view of the electrical circuit connections and associated devices arranged to show clearly the functioning of the control.

Referring first to Figs. 1 and 2, our invention is shown for purposes of illustration in connection with a flying shear of the type shown and described in Edwards Patent No. 1,521,514, dated December 30, 1924, although it is to be understood that our improved control mechanism is equally applicable to other types of flying shears. The shear, as shown, consists primarily of a swinging shear frame 1 pivoted at 2, the frame providing an opening or mouth 3 for receiving the moving billet or bar between a fixed blade 4 and a movable blade 5. In the operation of this type of shear, the frame 1 is adapted to be thrown in the direction of movement of the billet, as indicated by the arrow, by means of a piston 6 operating in a cylinder 7, see Fig. 2, this movement of the frame causing operation of the movable blade 5 to cut the billet by means not shown herein, since it forms no part of the present invention and is fully shown in the above mentioned Patent No. 1,521,514.

The cylinder 7 is provided with a valve casing 8 and the valve therein is adapted to be operated by means of a lever 9. The lever 9 is connected to the plunger 10 of a solenoid 11 so that when the solenoid 11 is energized the plunger 10 will be drawn upwardly to open the valve 8 and cause the shear to operate. The valve lever 9 is also connected to an operating rod 12, the upper end of which has a slotted head 12a which freely receives a pin provided at the end of one arm of a bell crank control handle 13 mounted in a pulpit 14 located adjacent to the shear where an operator may observe the functioning of the shear. In the position shown in Fig. 1, the master control handle 13 is set for automatic operation of the shear with the pin on the control handle 13 substantially midway of the slot in the head 12a so that movement of the plunger 10 when the shear solenoid 11 is energized has no effect on the handle 13. However, when the handle 13 is thrown to the extreme right the pin carried thereby engages the upper end of the slot in head 12a and the rod 12 is adapted to turn the valve lever 9 to manually operate the shear, independently of the solenoid 11, as will be hereinafter described.

Referring now to Fig. 2, there is shown a schematic diagram of the wiring of the apparatus as actually arranged in Fig. 1, the showing of Fig. 2 serving to make clear the principle of operation of the invention without reference to structural details which will hereinafter be considered. In Fig. 2 the solenoid 11 has one terminal permanently connected to one side of a source of electrical energy indicated at 15, while the other terminal thereof is connected in parallel through a suitable resistance 16, to pivotally mounted triggers 17 and 18. The triggers 17 and 18 are mounted in spaced relation and are provided with tail portions 17a and 18a that extend in the direction of a pair of control disks 19 and 20, respectively. The disks 19 and 20 are mounted on a shaft 21 and are adapted to rotate with the shaft 21 by means of suitable friction clutches shown in Fig. 7, in the absence of any force tending to oppose rotation of the disks 19 or 20. The shaft 21 is adapted to be driven in synchronism with the rolls 22 which convey the stock 23 in the direction of the shear, the gearing between the shaft 21 and the roll 22 being such that the speed of each disk 19 and 20 bears a fixed relation to that of the roll 22. In other words the turning of either disk 19 or 20 through a given angle represents the movement of a predetermined length of stock 23 between the rolls 22, as will be hereinafter fully set forth, so that there is always a fixed relation between the speed of the stock 23 and the angular velocity of each disk.

The disks 19 and 20 are provided with dogs 24 and 25 respectively, projecting from the periphery thereof and in the particular position of the parts shown in Fig. 2, the disk 19 is prevented from rotating with the shaft 21 by engagement of its dog 24 with one end of a pivoted stop lever 26. The stop 26 is held in the path of the dog 24 by means of a spring 27 and the stop lever 26 is adapted to be withdrawn from the dog 24 upon energization of a solenoid 28. A similar stop lever 29 is mounted adjacent to the other disk 20 in the same relative position that the lever 26 bears to the disk 19, and as shown in Fig. 2, the stop lever 29 is held away from the disk 20 against the action of its spring 30 by reason of the fact that the corresponding solenoid 31 is energized. As will hereinafter appear, the stop levers 26 and 29 respectively, are permanently mounted so that they always bear the same angular relation to the shaft 21 and disks 19 and 20.

The dog 25 on the second disk 20 is shown as being in engagement with a trip lever 32 which is acted upon by a starting or trip solenoid 33 to hold the end of the lever 32 in the path of the dog 25 against the pull of a spring 34. A similar trip lever 35 is provided for the first disk 19, but as shown, this lever is out of the path of movement of the dog 24 by reason of the fact that its solenoid 36 is then deenergized and the spring 37 is free to draw the lever 35 away from the disk 19. Both trip levers 32 and 35 are mounted on an adjustable support 38 extending parallel to the shaft 21, the support 38 being carried on an arm 39 that is adapted to be turned about the axis of the shaft 21, as will hereinafter more fully appear.

Figure 12:
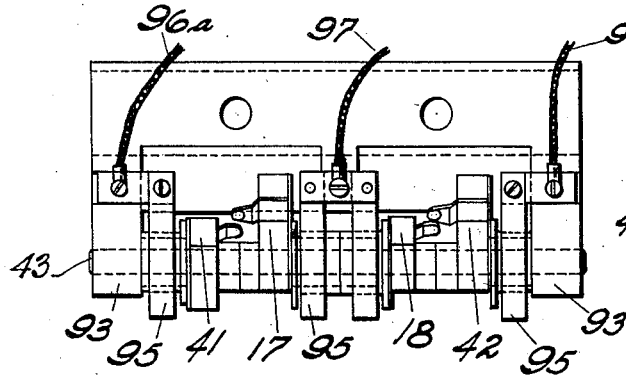

A second support 40 extending parallel to the support 38 and the shaft 21 carries the triggers 17 and 18 as well as two other triggers 41 and 42 mounted on the same pivot shaft 43 as the triggers 17 and 18, see Fig. 12. The triggers 41 and 42 provide tail portions 41a and 42a extending toward the disks 19 and 20 and normally the current carrying ends of each pair of triggers 17 and 41 and 18 and 42, respectively, are out of engagement with each other. The trigger 41 is connected to one terminal of the stop solenoid 31 of the disk 20, while the trigger 42 is connected to one terminal of the stop solenoid 28 of the disk 19. Inasmuch as the other terminals of the solenoids 28 and 31 respectively, are connected to the other side of the source at 15′, it is obvious that closing of either pair of triggers 17 and 41, or 18 and 42, will cause energization of the shear solenoid 11 and one or the other of the stop solenoids 28 and 31. The support 40 which carries the common pivot 43 of the triggers is mounted on an arm 44 turnable on the same axis as the arm 39, so that the angular relation of the set of triggers 17, 41, 18 and 42 and the pair of trips 32 and 35 can be varied both in respect to each other with respect to the stops 26 and 29, as will hereinafter more fully appear.

As shown in both Figs. 1 and 2, a suitable detector device responsive to movement of the stock is placed between rolls 22 and the shear, the flag 45 employed herein as said detector being adapted to be depressed by the passage of stock 23, although a device responsive to radiant energy of the stock would suffice. With the rolls 22 free, the raised flag permits engagement between contacts 46 and 46a, contact 46 being movable and permanently connected to the line 15. The stationary contact 46a is connected through a resistance 47 to the pivoted bridging member 48 of a relay so constructed that the ends of the member 48 will engage one or the other of spaced stationary contacts 49 and 50. As shown in Fig. 2, the member 48 is in engagement with the contact 49, so that with the flag 45 raised, current is flowing from the line at 15 through contacts 46 and 46a, the relay, and from thence in series through the trip solenoid 33 and the stop solenoid 31 back to the line 15′. At this time the trip 32 prevents the disk 20 from rotating with the shaft 21, while the stop 29 of the same disk is held out of the path of the dog 25. Also, the stop solenoid 28 is deenergized, thereby permitting the spring 27 to hold the stop 26 against the dog 24 of the disk 19.

Figure 3:
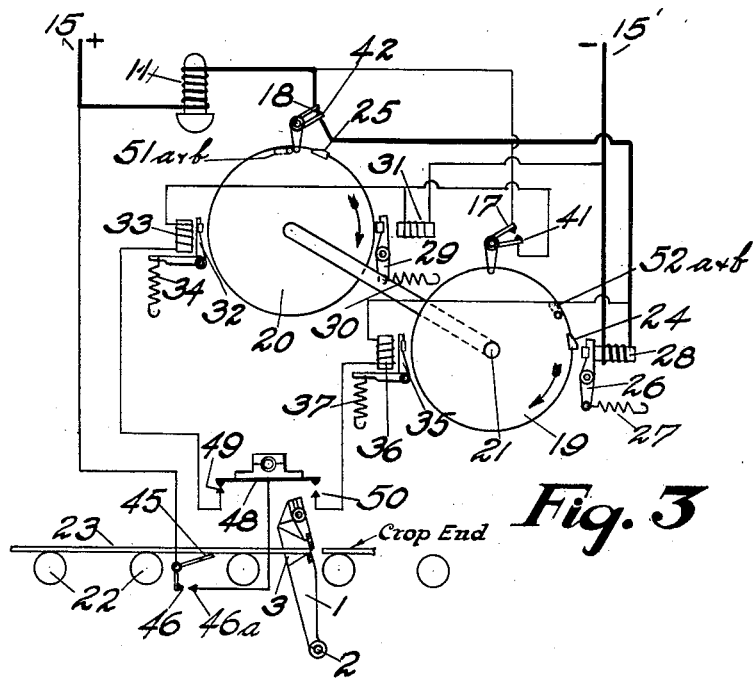
Fig. 3 is a schematic view similar to Fig. 2, showing the functioning of the parts in cutting the front crop.

Now assume that stock 23 approaches the shear over the rolls 22 and depresses the flag 45. When this occurs the holding circuit of the trip solenoid 33 is broken at the separable flag contacts 46 and 46a, thereby allowing the spring 34 to withdraw the trip 32 from the dog 25 and permitting the disk 20 to rotate with the shaft 21 in a clockwise direction. It will also be noted that breaking the holding circuit of the solenoid 31 has permitted the stop 29 to be positioned in the path of the approaching dog 25. As the disk 20 turns with the shaft 21 a pair of dogs 51a and 51b carried on opposite sides of the disk 20 just behind the stop dog 25, come into engagement with the tails 18a and 42a of the triggers 18 and 42, thereby moving the current carrying ends of these triggers into engagement and establishing a circuit through the shear solenoid 11. This condition of affairs is illustrated in Fig. 3, from which it is apparent that by the time the dogs 51a and 51b engage the tails of the triggers 18 and 42, the advancing end of the stock 23 has passed between the blades of the shear so that operation of the blades 4 and 5 upon energization of the shear solenoid 11 will cause a short crop end to be cut off.

Figure 4:
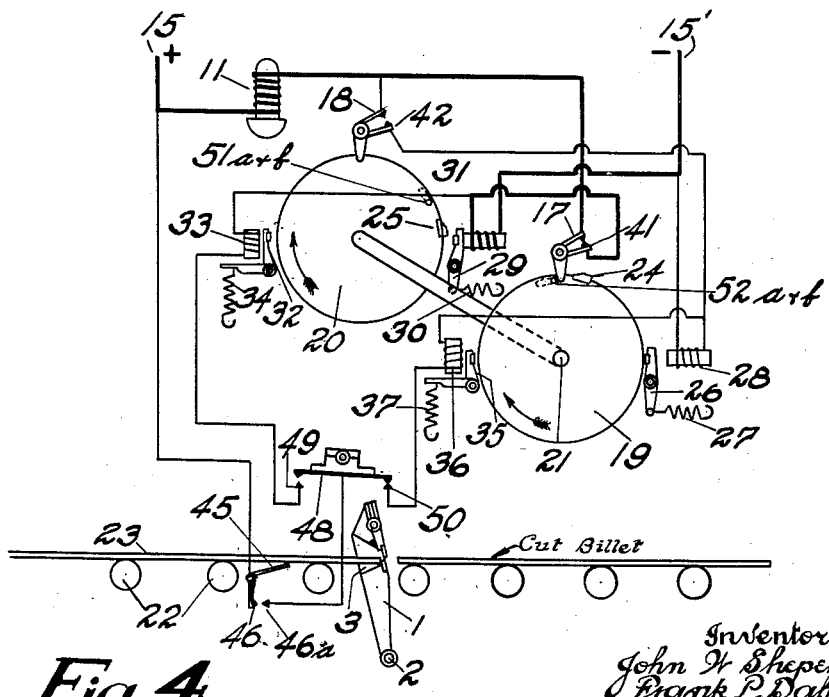
Fig. 4 is a schematic view similar to Fig. 2, showing the functioning of the parts in making a dividing cut.

As previously pointed out, the current in flowing through the shear solenoid 11 will also flow in series through the stop solenoid 28 of the disk 19, so that as the shear operates to cut the crop end, the stop 26 will be withdrawn from the dog 24 to permit rotation of the disk 19. At this time the trip 35 is held retracted by its spring 37 so that as the disk 19 rotates it will pass the stop 35 without interruption and will continue until a pair of dogs 52a and 52b on opposite sides of this disk engage the tail ends 17a and 41a of the pair of triggers 17 and 41, thereby again energizing the shear solenoid 11 and causing the stock 23 to be severed, see Fig. 4. When the stock is cut the second time, following engagement of the triggers 17 and 41, it is obvious that the length of the second piece will be several times longer than the length of the crop end previously severed, owing to the fact that the disk 19 traveled through a considerably wider angle than the disk 20 in moving the dogs 52a and 52b from their starting position to the point where they engaged the triggers 17 and 41, as shown in Fig. 4. In cutting the crop end most of the turning movement of the disk 20 only served to measure the movement of the stock from the flag 45 to the shear and the crop cut therefore is made shortly after the stock enters between the blades.

When the flag 45 is depressed by passage of the rolled product, as previously described, the circuit of the stop solenoid 31 is broken at the same time the starting or trip solenoid 33 is deenergized to release the dog 25 on the disk 20 from the trip lever 32. Consequently, the spring 30 holds the stop 29 in the path of the dog 25 and the disk 20 comes to rest shortly after the dogs 51a and 51b engage the triggers 18 and 42. The disk 20 then remains at rest until the dogs 52a and 52b on the disk 19 close the triggers 17 and 41, whereupon current again flows through the stop solenoid 31 to release the dog 25 from the stop 29. The engagement between the triggers 17 and 41 is only for a very short time, but the period is long enough to permit the stop 29 to release the dog 25 and thus start the disk 20 on a complete revolution. As soon as the solenoid 31 is deenergized by the opening of the triggers 17 and 41, the spring 30 returns the stop 29 into the path of the dog 25, so that the disk 20 will be automatically stopped after a complete revolution. The same holds true for the disk 19 which comes to rest at the end of each revolution with its dog 24 in engagement with the stop 26.

The second movement of the disk 20 in the manner just described is not arrested by the trip 32 inasmuch as the solenoid 33 is then deenergized, thus permitting the spring 34 to hold the trip 32 out of the path of the movement of the dog 25. Consequently, the disk 20 continues to rotate until its dogs 51a and 51b engage the tail ends of the triggers 18 and 42, thereupon again energizing the shear solenoid 11 to produce another dividing cut of the shear. The length so cut will correspond exactly to the length measured and cut off by the above described rotation of the disk 19, owing to the fact that the disk 20 starts from the same relative position with respect to shaft 21 as did the disk 19 and that the angular relation between the dogs 51a and 51b and the triggers 18 and 42 is exactly the same as the angular relation between the dogs 52a and 52b and the triggers 17 and 41 when either disk 19 or 20 starts to rotate.

Obviously the closure of the triggers 18 and 42 releases the then stationary disk 19 through energization of the stop solenoid 28, so that the rotation of the disk 19 is automatically resumed, for the measurement and severance of a third equal length from the elongated moving piece 23; thereafter, the disk 20 becomes operative through a single revolution, for the measurement of the next length that is severed by the shear. Thus the operation of our improved control mechanism, after removal of the front crop from any elongated piece of stock 23, involves alternating single revolutions of the two disks 19 and 20, starting and ending at their respective stops 26 and 29, and with every such revolution causing a cutting operation of the shear, by the closing of the pair of triggers 17, 41 or 18, 42, as the case may be. These dividing operations of the shear, by which a given elongated piece 23 is cut up into a series of smaller pieces, all of the same length, continue until the tail end of said piece 23 gets past the flag 45, at which time the circuit through bridging member 51, contact 46 and resistance 50 is reestablished. When this occurs, either the solenoid 33 or the solenoid 36 is energized, to bring the corresponding trip 32 or 35 in the path of dog 25 or dog 24, so that whichever disk (19 or 20) that happens then to be in motion will be automatically brought to rest before it completes its full revolution. Said moving disk therefore comes to rest shortly after the flag 45 is released by the passage of the last end of the billet.

The pivoted bridging member 48 of the relay is mounted as shown in Fig. 9, so that when the solenoid 31 is energized, the arm 48 will be in engagement with the contact 49, as shown in Fig. 2. However, when the solenoid 28 is energized, the contact 50 will be engaged by the bridging member 48. Thus either the solenoid 33 or the solenoid 36 will be energized to arrest turning movement of the corresponding disks 20 or 19 as soon as the flag 45 is released by the tail end of the stock. The parallel connection of the solenoids 33 and 36 insures that the disks 19 and 20 will be stopped in the shortest possible time after the tail end of the billet has passed from the flag 45. When the closure of the triggers 18 and 42 energizes the solenoid 28 to release the stop 26, the bridging member 48 engages the stationary contact 50 to energize the trip solenoid 36, whereas when the solenoid 31 is energized the bridging member 48 is moved to the position shown in Fig. 2, where current will flow through the solenoid 33 to cause the trip 32 to stop the disk 20. In this way the disk which is turning is caught by its corresponding trip before the other disk has a chance to be released, and the control mechanism thus resets itself in position to produce the shear's initial crop cut and subsequent dividing cuts on the next-arriving piece of stock 23 that strikes the flag 45.

Figure 6:
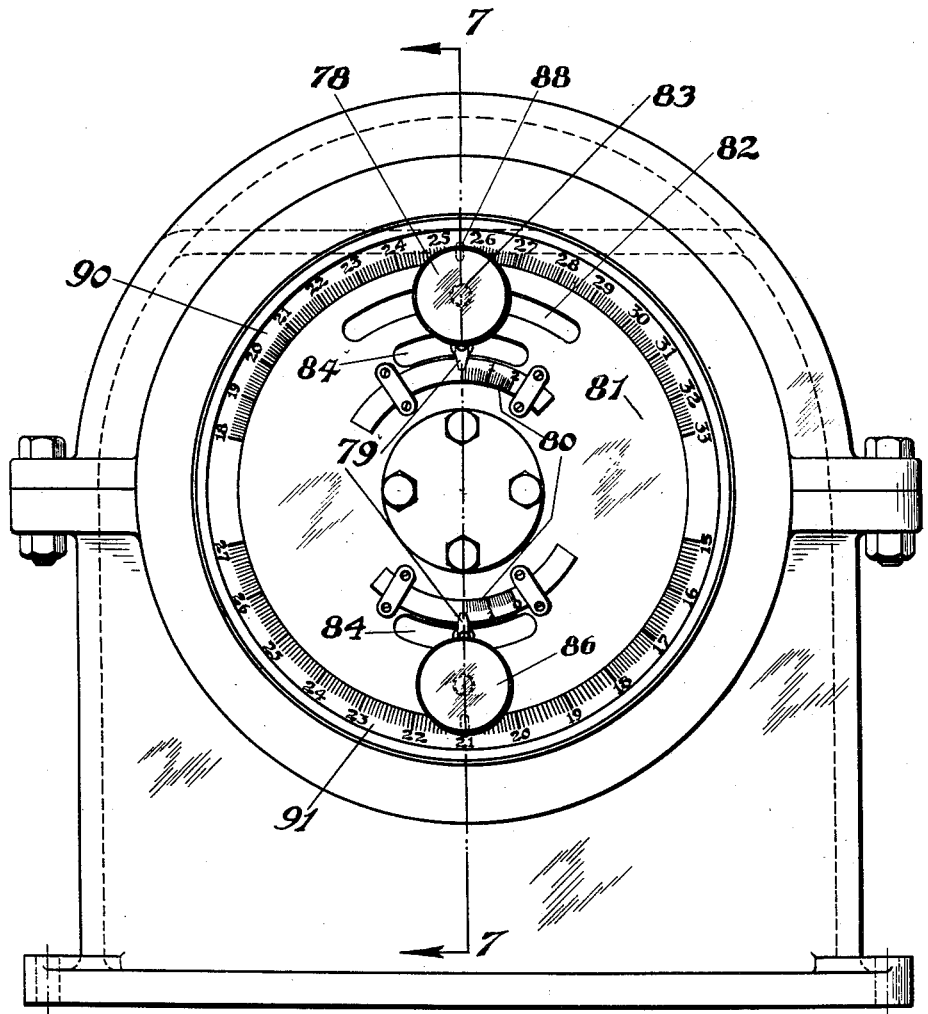
Fig. 6 is a view in end elevation of the control box.
Figure 7:
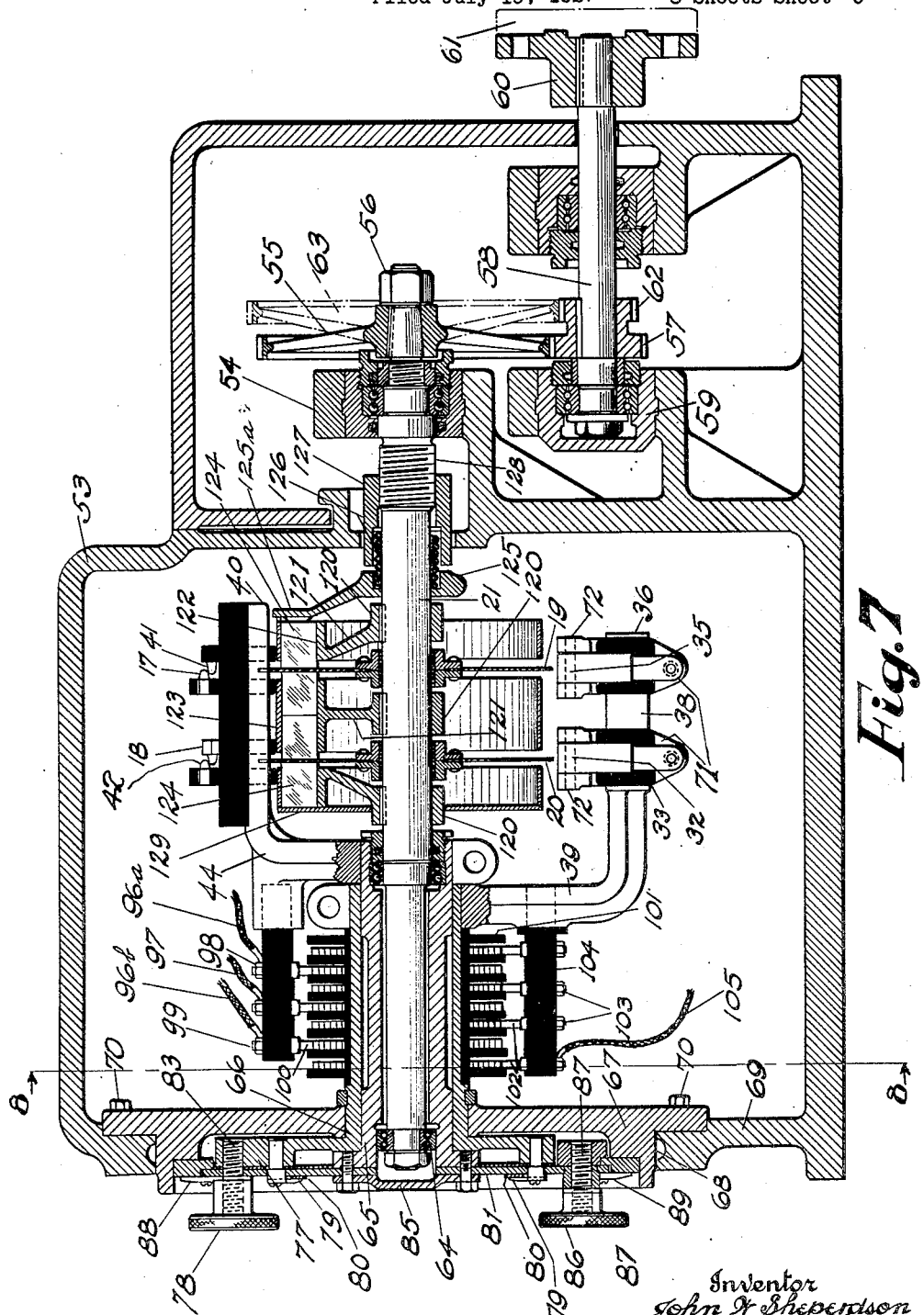
Fig. 7 is a vertical sectional view along the line 7—7 of Fig. 6, looking in the direction of the arrows.
Figure 8:
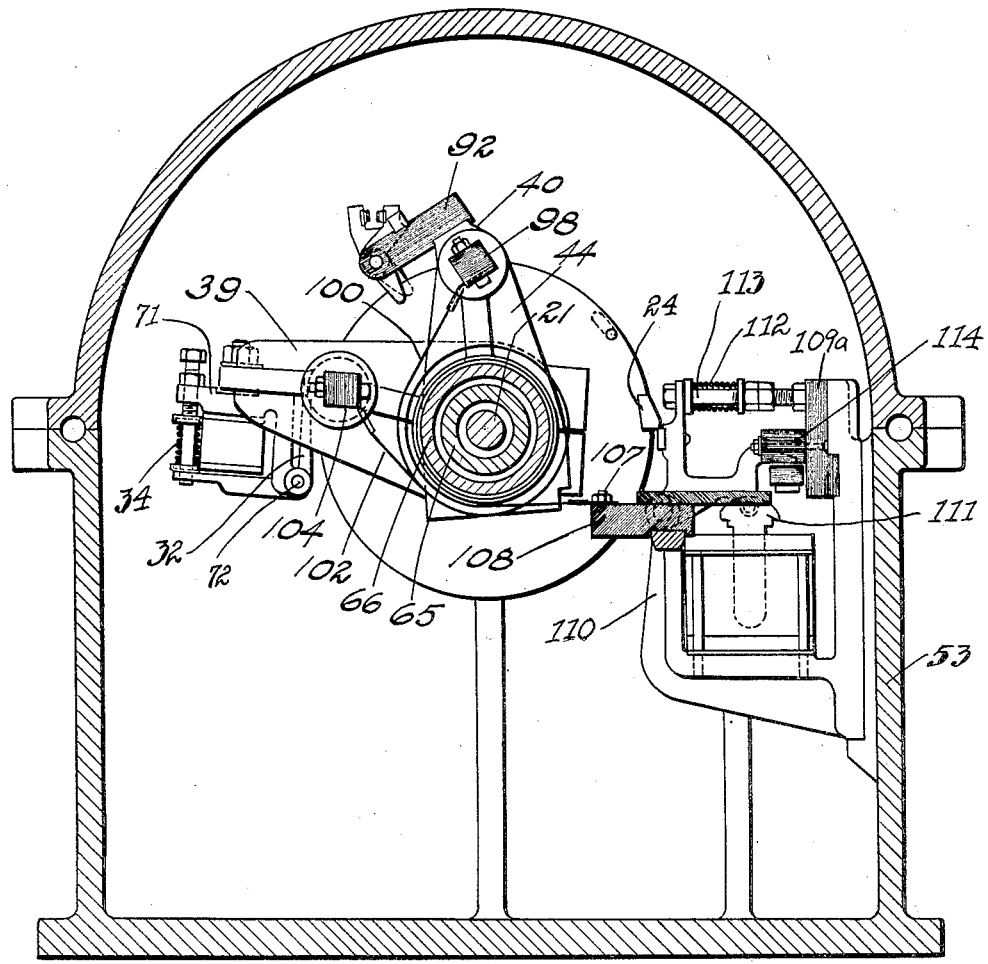
Fig. 8 is a vertical sectional view along the line 8—8 of Fig. 7.

Referring now to Figs. 6, 7 and 8, the control apparatus just described is mounted within a housing 53 which provides a bearing 54 for one end of the shaft 21 which carries the control disks 19 and 20. The shaft 21 extends beyond the bearing 54 and carries a gear 55 secured thereto by means of a nut 56. The gear 55 is in mesh with a pinion 57 carried on a countershaft 58, also journalled in the housing 53, as indicated at 59. The countershaft 58 extends beyond the housing and is provided with a hub 60 to which may be secured a coupling or other suitable driving member 61, whereby the countershaft 58 may be driven from one of the rolls 22, indicated in Fig. 2. As an alternative, the motor driving the rolls 22 could be used to drive countershaft 58. The countershaft 58 also carries a second pinion 62 smaller than the pinion 57 and this second pinion 62 is adapted to be meshed with a second gear 63, shown in dotted lines in Fig. 7, as being mounted on the shaft 21. In operation, only one or the other of the gears 55 and 63 are employed in accordance with the speed ratio that it is desired to obtain between the shaft 21 and the shaft of the roll 22 which drives the countershaft 58. The purpose of this adjustable speed ratio will be hereinafter described.

Still referring to Fig. 7, it will be seen that the left hand end of the disk shaft 21 is rotatably supported in ball bearings 64 carried by a sleeve 65 which in turn is loosely received within a second sleeve 66 supported by an end plate 67. The end plate 67 is received within an opening 68 provided in the end wall 69 of the casing 53 and the end plate 67 is secured to the end wall 69 by any suitable means, such as bolts 70. The outer sleeve 66 carries the arm 39 previously referred to in connection with Fig. 2, and a continuation of this arm provides the support 38 which extends parallel to the shaft 21 for carrying the trip levers 32 and 35 and their associated solenoids 33 and 36. The inner sleeve 65 carries the arm 44 previously referred to, which provides the support 40 carrying the pairs of triggers 17 and 41 and 18 and 42, respectively.

Referring now to Figs. 8 and 15, it will be seen that the support 38 carries a pair of spaced magnet frames 71 for the solenoids 33 and 36, and that the frames 71 also provide pivotal supports 72 for the trip levers 32 and 35. The springs 34 and 37 which serve to hold the trip levers away from the disks 19 and 20 are carried by studs 73 adjustable within each magnet frame 71 by means of nuts 74. An adjustable stop 75 in threaded engagement with a lug 76 of each magnet frame 71 serves to limit the backward throw of each trip lever under the influence of its spring.

Thus both trip levers 32 and 35 with their solenoids 33 and 36 are movable as a unit with the arm 39, which in turn is capable of angular movement about the axis of the shaft 21 with its supporting sleeve 66. As shown in Fig. 7, the sleeve 66 provides a flange 77 beyond the end plate 67, to which is secured a handle 78, whereby the sleeve 66 may be turned to impart angular movement to the arm 39 and the trip levers 32 and 35 carried thereby. The flange 77 also carries pointers 79, which, as shown in Fig. 6, are arranged at diametrically opposite points on the flange and are adapted to cooperate with scales 80 carried on a plate 81 in front of the flange 77, but not connected thereto. In order to permit turning movement of the flange 77 independently of the plate 81 the latter is provided with a slot 82 through which the stud 83 carrying the handle 78 extends. The plate 81 also provides slots 84 through which the scale pointers 79 extend.

As shown in Fig. 7, the plate 81 which carries the scales 80 is secured to the end of the inner sleeve 65 by means of a cap 85, and a handle 86 is secured to this plate 81 by means of a stud 87. The plate 81 also carries pointers 88 and 89 at diametrically opposite points on its outer periphery, which cooperate with scales 90 and 91 shown in Fig. 6 as being differently graduated for a purpose which will hereinafter appear. As previously pointed out, the arm 44 secured to the inner sleeve 65 provides a support 40 for the two pairs of triggers 17 and 41, and 18 and 42, and the unitary mounting for these triggers, as well as their operation, is best shown in the enlarged views of Figs. 11a to 11d inclusive, 12 and 13.

Figure 13:
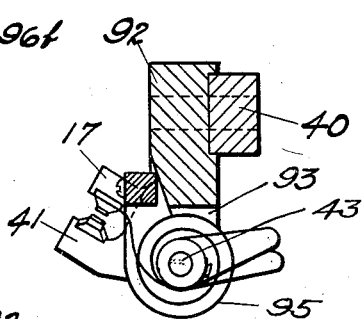
Fig. 13 is a sectional view along the line 13—13 of Fig. 12, looking in the direction of the arrows.

As best shown in Fig. 13, the longitudinal support 40 carries a block 92 which provides a number of spaced lugs 93 for supporting the pivot shaft 43. The several triggers 17 and 41, and 18 and 42 are rotatably mounted on the shaft 43, and coil springs 95 secured at their ends to the block 92 and the triggers, respectively, serve to hold the contact carrying ends of the triggers separated, as shown clearly in Fig. 11a. Electric current is adapted to be led to the triggers 41 and 42 through their associated springs 95 by means of conductors 96a and 96b, while current is adapted to be led in parallel to both triggers 17 and 18 by means of a conductor 97 connected to both of the springs 95. As shown in Figs. 7 and 8 the conductors 96a, 96b and 97 are connected to terminal bolts 99 on an insulating block 98 extending from the arm 44, and each terminal bolt 99 has one end of a coiled conducting spring 100 connected thereto. The springs 100 surround the outer sleeve 66 and are insulated therefrom and from each other by barriers of insulating material 101. The sleeve 66 is surrounded by four other springs 102 which are connected to terminal bolts 103 carried by an insulating block 104 extending from the arm 39 which carries the magnet frames 71. Suitable leads 105 extend from the bolts 103 on block 104 to the terminals of the solenoids 33 and 36, respectively see Fig. 1. The inner ends of all the springs 100 and 102 are connected to terminals 107 on a block 108 from which current may be led to the various devices within the housing 53 in accordance with the wiring diagram of Fig. 1. It is obvious that with this arrangement of coiled conducting springs 100 and 102 it is possible to turn the sleeves 65 and 66 by means of the handles 86 and 78 respectively, without interfering with the passage of current to the various devices.

Referring now to Fig. 14, the two solenoids 28 and 31 are shown mounted in side by side relation on a bracket 109 which provides upwardly extending lugs 110 for pivotally supporting the stop levers 26 and 29 in axial alinement, each lever being in the form of a bell crank with one end pivotally connected to the armature or plunger 111 of the corresponding solenoid 28 or 31. Springs 112 surrounding studs 113 bear against the ends of levers 26 and 29 and tend to hold the stop levers in the path of the dogs 24 or 25 on the disks 19 and 20, except when either solenoid 28 or 31 is energized to pull its armature 111 downwardly and turn the associated stop lever 26 or 29 in a clockwise direction against its spring 112.

As previously pointed out, the bridging member 48 of the relay is under the control of the stop levers 26 and 29, so that a circuit will be closed through either the stationary contacts 49 or 50, depending on whether the solenoid 28 or the solenoid 31 is energized. This construction is shown clearly in Figs. 9 and 10, wherein the bridging conducting member 48 is carried by a lever 114 of insulating material mounted on a pivot 115 projecting from an insulating block 109a. The lever 114 is made in two parts secured together by studs 116, with springs 117 surrounding the studs 116 which tend to frictionally hold the parts of the lever 114 together on the pivot 115 so that the lever will remain in position on the pivot. The stop levers 26 and 29 provide extensions 118 and 119 which overhang the ends of the lever 114, as shown in Fig. 14, so that when either one or the other of the stop levers are actuated by its solenoid 28 or 31, the relay lever 114 will be turned on its pivot 115. Thus when the solenoid 28 is energized to operate the stop lever 26, the lever 114 will be turned in a clockwise direction to bring the left hand end of the bridging member 48 into engagement with the left hand contact 49, thereby partly establishing the circuit through the other stop solenoid 31 at this point.

Referring to Fig. 7, there will now be described the frictional driving connection between the disks 19 and 20 and the shaft 21, whereby the disks 19 and 20 always tend to rotate with the shaft 21 unless this rotational movement is positively prevented by the engagement of the dogs 24 and 25 with either the stop levers 26 and 29, or the trip levers 32 and 35. The frictional driving connection 70 comprises a number of spiders 120 keyed to the shaft 21 on opposite sides of the disks 19 and 20, each spider providing radial arms 121 supporting a peripheral rim 122. The arms 121 provide near the rims 122 rectangular openings 123, within which are received blocks 124 of frictional material. The arms 121 of the several spiders 120 all bear the same angular relation to the shaft 21, so that each series of blocks 124 are in horizontal alinement. The blocks 124 are free to slide in their openings 123 and each series of blocks is pressed into engagement with the disks 19 and 20 by the spaced arms 125a of a spider 125 slidably mounted on the shaft 21. The spider 125 is pressed in the direction of the fixed spiders 120 by means of a spring 126 surrounding the shaft 21 with a portion thereof received within a sleeve 127 adjustable on the shaft 21 by reason of its cooperation with threads 128 provided on the shaft 21 adjacent to the journal 54. The blocks 124 carried by the left hand spider 120 are pressed by the spring 126 and arms 125a against a stationary end plate 129 carried by the left hand spider 120, so that each disk 19 and 20 is engaged with a considerable pressure on opposite faces thereof by the several pairs of blocks 124.

The disks 19 and 20 being very light in weight, the pressure exerted by the blocks 124 is quite sufficient to cause them to rotate with the shaft 21 in the absence of any force opposing such rotation. However, when either of the dogs 24 or 25 positively engages one of the stop levers 26 or 29, or one of the trip levers 32 or 35, the rotation of the corresponding disk is immediately arrested and the blocks 124 in engagement with that particular disk slide freely around the opposite faces of the disk. Should the rotation of the disk 19, for example, be so arrested, the arms of the spider 125 are still effective to transmit sufficient pressure through each series of blocks 124 to cause rotation of the other disk 20. We have found that a suitable material for the blocks 124 is hard graphite, such as is employed for brushes for electrical apparatus. This material possesses sufficient frictional qualities to closely grip the disks 19 and 20 to drive them and at the same time permitting ready sliding of the brushes over the opposed faces of a stationary disk. Obviously other material of a similar nature can be employed for the blocks, or other frictional driving devices be provided.

Referring again to Fig. 1, there is shown the actual circuit connections of the apparatus within the control housing 53, the various pieces of apparatus of course, being shown very much reduced in size and in a simplified manner. There is also shown in Fig. 1 a control panel 130 mounted on the pulpit 14 previously described as being located adjacent to the shear, so that an operator in the pulpit can readily observe the operation of the shear. The control handle 13 previously referred to is mounted on this panel 130 and the circuit connections between the panel 130 and the control housing 53 will now be traced for the automatic position of the handle 13. The source of electrical energy is indicated at 15 and 15', and both leads from the source are brought into a double throw switch 131 which, when closed, connects the + side of the line at 15 to a stationary control switch contact 132 which is adjacent a second contact 133 connected to one terminal of the shear solenoid 11. The other terminal of the shear solenoid 11 is connected to a third control switch contact 134 which is mounted on the panel 130 adjacent a fourth contact 135. The contact 135 is connected through a conductor 136 and resistance 16 to the terminal 107a on the block 108 that is in turn connected to the triggers 17 and 18 respectively. When the control handle 13 is in its extreme left hand position, or "automatic", as shown in Fig. 1, the contacts 132 and 133 are bridged by a segment 137 on the control handle, while the contacts 134 and 135 are bridged by a segment 138. Consequently the circuit through the shear solenoid 11 is as shown diagrammatically in Fig. 2.

The lead from the + side of the switch 131 also includes a circuit through a normally closed push button 139 on the panel 130 through a conductor 140 to the pivoted contact 46 of the flag 45, from which a circuit is made through the stationary contact 46a and resistance 47 to the movable bridging member 48 of the relay, as indicated in Fig. 2. The push button 139 is normally closed, but by pressing the same it is possible to open the circuit through the trip solenoids 33 and 36 just as if the flag 45 had been depressed by the passage of the rolled product. Thus it is possible for the operator in the pulpit 14 to release either the disk 19 or the disk 20 by deenergizing the corresponding trip solenoid 33 or 36 and so ascertain that the apparatus is in operating condition.

The − side of the line at 15' is connected through the switch 131 and a conductor 141 to one terminal of each of the stop solenoids 28 and 31 just as indicated in Fig. 2, so that these solenoids are permanently connected in parallel to one side of the line in all positions of the control handle 13. The panel 130 also provides a second push button 142 which is normally open, the stationary contacts of this push button 142 being connected by conductors 143 to the normally opened pairs of triggers 18 and 42. By depressing the push button 142 and thus bridging its open contacts it is possible to manually operate the shear at any time, since depressing the button establishes the circuit of the shear solenoid 11 by short circuiting the normally opened triggers 18 and 42. Thus it is possible for the operator to manually operate the shear at any time, irrespective of the circuit relations between the other pieces of apparatus.

When the control handle 13 is moved to its middle or "off" position, the pairs of contacts 132 and 133, and 134 and 135, respectively, are opened, thereby making it impossible to complete the circuit of the shear solenoid 11. When the handle 13 is moved to this "off" position, a contact 144 carried thereby bridges a pair of stationary contact segments 145, one of which is permanently connected to the + plus side of the line at 15, while the other is connected to the conductor 140 in circuit with the flag contact 46a. With the handle 13 in the "off" position it is possible to maintain the holding circuit for either of the trip solenoids 33 and 36 respectively, thus keeping the control apparatus in such a condition that one or the other of the disks 19 or 20 will be ready to be tripped when the apparatus is next automatically operated.

The control handle 13 has a third position labelled "hand trip" at the extreme right, and as previously explained, when the handle 13 is moved to this position, the rod 12 opens the valve 8 and causes the shear to be operated. This enables the operator to test out the shear independently of the shear solenoid 11. In this position of the handle 13 the holding circuit for the trip solenoids 33 and 36 is still maintained through the segments 145 and contact 144 just as in the "off" position previously described.

Before proceeding with a further discussion of the operation of our apparatus, the manner of setting the device for cutting billets of different lengths from the rolled product will be further discussed with reference to Figs. 2 to 5, inclusive. Bearing in mind the fact that the stop levers 26 and 29 are fixed in position while the triggers 17 and 41, and 18 and 42, respectively, are angularly adjustable, it is evident that with the shaft 21 rotating in a clockwise direction, the angle A between the trigger dogs and the triggers will substantially determine the lengths of the billets successively cut from the moving stock. We have also discovered that the angle B which represents the displacement between the trigger dogs and the triggers measured against the direction of rotation must be less than the angle A in order to insure that one disk will be reset before the tripping dog on the other disk has a chance to travel from its released position to where it engages the shear operating triggers. To take care of this essential condition we have chosen a maximum value for the angle B of 174°, which leaves 186° for the minimum value at angle A to cause the cutting of the shortest possible billet. Furthermore, on account of mechanical clearances necessary between the triggers and trigger dogs and the stop levers 26 and 29, the angle B cannot be made less than 19°, thus leaving 341° as a maximum value of the angle A. Since 341° represents the longest billet that can be cut, it follows that the shortest length that can be measured for a given speed ratio between the measuring device shaft 21 and the rolls 22 is $$\frac{186}{341}$$

or 54½% of the maximum length of billet which it is possible to cut.

Referring now to Fig. 6, it will be seen that the lower scale 91 is graduated from 15 up to 27, which means that the lower handle 86 can be set for cutting billets from 15 feet to 27 feet. With this range, 15 is approximately 55% of 27, as figured above, and this range of billet lengths as determined by the scale 91, is also dependent upon the ratio between the gear 55 and the pinion 57, as shown in Fig. 7. In determining this gear ratio, the maximum delivery speed of the stock which will be cut by the shears, and the maximum length which can be cut with this ratio must be considered, for example, assuming the maximum delivery speed of 750 feet per minute and the maximum billet length of 27 feet, as with the billet scale 91, it follows that the shaft 21 must be driven at a maximum speed of $$\frac{750}{27} \times \frac{341}{360}$$

or 26.3 R. P. M. When this speed ratio has once been established by the gearing, it is only necessary to move the handle 86 to various settings on the lower scale 91 to obtain the corresponding lengths of billets.

As previously pointed out however, the countershaft 58 is provided with a second pinion 62 adapted to engage a larger gear 63 to reduce the speed of the shaft 21 and the upper scale 90 is for this second gear ratio. The upper scale 90 is adapted to provide for the cutting of billets from 18 feet to 33 feet, and it will be noted that in this range the minimum length 18 feet is substantially 55% of 33 feet. It will also be noted that the shaft 21 is to be driven at a slower speed for this ratio, as compared with the ratio for the lower scale, and this would naturally follow from a calculation of the speed of the shaft 21 based on a delivery speed of 750 feet per minute and a maximum length of 33 feet, e. g.

$$\frac{750}{33} \times \frac{341}{360}$$

or 21.5 R. P. M.

Obviously our device could be further modified to provide for other ranges in the lengths of billets, and the figures shown on the scales in Fig. 6 are arbitrarily chosen, merely as an illustrative example of the usual commercial ranges of billets. Furthermore, it is obvious that the discussion of the values of the angles A and B is also for purposes of illustration, for obviously other angles may be chosen from which to figure the ratio between the minimum and maximum lengths of billets, provided that the angle B is always less than the angle A.

As previously pointed out, the setting of the trip levers 32 and 35 determines the length of the crop end cut off each new piece of stock delivered by the mill, and the angle C between the levers 32 and 35 and the triggers determines the length of each crop end. The angle C also represents the angular displacement of each disk in order to measure the distance between the flag 45 and the shear blades 4 and 5, and for purposes of illustration, in Fig. 5 the angle C is shown as including two other angles D and E respectively. The angle D represents the angular displacement of the shaft 21 while the stock is moving from the flag 45 to the shear, while the angle E represents the length of the material passed between the shear blades before the triggers are closed to actuate the shear and cut off the crop end. Obviously the distance between the trigger 45 and the shear arbitrarily determines the angle D and the crop end scales 80 are initially adjusted with respect to the handle 78, so that the scale markings represent only the movement of the disks through the angle E. In other words, with the pointers 79 at zero on the crop end scales 80, the trip levers 32 and 35 would be set so that the angle E would be practically zero and the shear would operate almost as soon as the advancing end of the stock from the depressed flag 45 entered between the shear blades 4 and 5. Therefore the markings on the crop end scales 80 are a true measure of the amount of crop end that will be cut off from a given displacement between the trigger 45 and the shear, and for a given speed of the shaft 21, determined as previously set forth.

Let it now be assumed that it is desired to operate our device so as to cut the stock into lengths of 20 feet following the initial cutting of a crop end of 2 feet. In order to accomplish this result the lower handle 86 is loosened by turning and the pointer is brought to the mark "20" on the lower scale 91, after which the handle 86 is turned to clamp it tightly in position. This scale setting is made on the assumption that pinion 57 is in engagement with the gear 55 as shown in Fig. 7. The upper handle 78 is loosened in the same manner and the lower pointer 79 brought into register with the mark "2" on the lower crop scale 80, after which the handle 78 is tightened.

The control handle 13 in the pulpit 14 is then moved to the automatic position at the extreme left, although prior to this the operator may test out the shear and the controls by means of the push buttons 139 and 142. With the handle 13 in the automatic position and the line switch 131 closed, everything is in readiness for the automatic operation of the measuring device as soon as the front end of the rolled product comes over the rolls 22 and depresses the flag 45. The automatic functioning of our device to first cut the crop end from the stock and then cut the remainder thereof into billets of equal length has been previously described in great detail with reference to Figs. 2, 3 and 4, so that it is not necessary to describe this automatic operation in detail again. Suffice it to say at this point that with the control handles 78 and 86 set as just described, a crop end of 2 feet will first be severed and then the shear solenoid 11 will be energized alternately by the disk 19 and the disk 20 to cause the shear to cut the stock 23 into billets of exactly equal length. As soon as the rear end of the stock leaves the flag 45, the latter moves back to its original position in engagement with its stationary contact 46a, whereupon whichever disk 19 or 20 is rotating is stopped by its corresponding trip lever 35 or 32 through reestablishment of the circuit of either the trip solenoid 33 or 36. This resetting of the device takes place very quickly after the flag 45 is released, so that when the next piece of stock comes along and depresses the flag 45 the parts are in position to immediately release the disk which has been last tripper so as to start measuring the crop end of the second piece of stock.

Obviously the above described functioning of our device will continue so long as the mill continues to deliver stock and the handle 13 is held in the automatic position. At any time, of course, the operator can temporarily stop the delivery of stock in order to make adjustments of the measuring device, as for example, when the operator finds that the crop ends being cut are too long or too short. In this case it is an easy matter to loosen the handle 78 and reset the trip levers 32 and 35 to cut a slightly different length of crop end. Likewise, when it is desired to change the length of the billets being cut it is an easy matter to loosen the handle 86 and reset either pointer 89 on its corresponding scale 90 or 91. In case it should be desired to cut 30 foot billets after setting the lower scale 91 for 20 foot billets, it is only necessary to take off the high speed gear 55 and replace it with the low speed gear 63, as indicated in dotted lines in Fig. 7. When this has been done the lower handle 86 is moved to bring the upper scale pointer 89 into register with the scale mark "30" on the upper scale 90.

From the foregoing it is apparent that by our invention we have provided an extremely effective means for accurately controlling the operation of a flying shear so as to cut stock into billets of exactly equal length. Our improved control differs from the means heretofore employed for controlling the operation of the flying shear in that the entire sequence of operations with respect to a given length of rolled product is initiated through the mere depression of a flag by the advancing end of the stock, after which the shear proceeds to cut off a crop end of predetermined length and to cut the remainder of the piece into billets of exactly equal length. As previously pointed out, nothing is left to the judgement of the operator in cutting off crop ends, nor is it necessary to speed up the billets after they have been cut. Once the operation of the control is initiated the cutting of the stock proceeds in a measured and exact manner without any attention whatsoever on the part of the operator, irrespective of any variations in the speed of delivery of the stock. Our device is also particularly characterized by its extreme flexibility as regards the setting of the control for cutting billets of different length. It is readily apparent that the billet scales 90 and 91 provide a wide range of billet lengths usually found in mill practice, so that billets may be cut within this range by merely moving the handle 86 and without requiring any further adjustment or rearrangement of the parts of the apparatus.

Referring back to Figs. 11a to 11d inclusive, the exact functioning of the trigger dogs and the triggers will last be described inasmuch as this particular functioning is not absolutely essential to the general mode of operation of our control as set forth above. While the cooperation of the dogs 52a and 52b with the triggers 17 and 41 respectively is shown in Fig. 11a, the following description of this cooperation applies equally as well to the dogs 51a and 51b on disk 20 in their cooperation with the triggers 18 and 42 respectively.

Figure 11A:
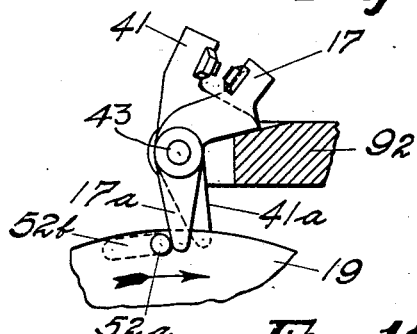
Figs. 11a, 11b, 11c and 11d are enlarged views of the shear-controlling triggers shown in different positions.
Figure 11B:
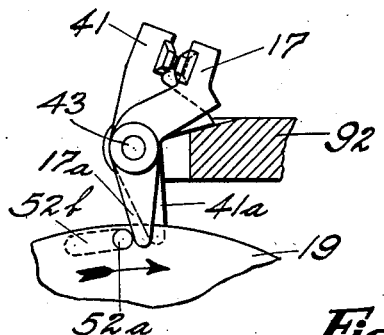
Figure 11C:
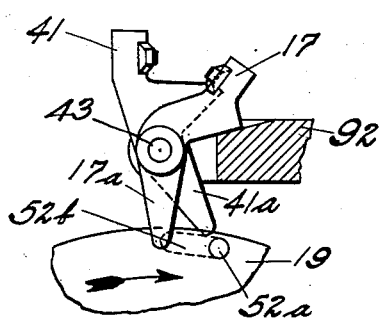
Figure 11D:
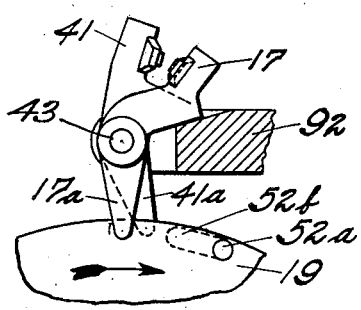

In Fig. 11a the dog 52a is shown moving in the direction of the arrow so as to engage the tail 17a of the trigger 17 and move its current carrying end into engagement with the current carrying end of the trigger 41, as indicated in Fig. 11b. As this occurs the dog 52b on the opposite side of the disk 19 has not yet engaged the tail 41a of the trigger 41 and in fact the dog 52b does not engage the tail 41a until the dog 52a is about to release the trigger 17. When the tail 17a does leave the dog 52a, the circuit between the triggers 17 and 41 is broken and the gap between the ends of the triggers 17 and 41 is greatly increased by the engagement of the dog 52b with the tail 41a which serves to further separate the triggers, as shown in Fig. 11c.

The above described action of the dogs 52a and 52b has the effect of rapidly increasing the gap between the triggers as the circuit is broken, which will serve to quickly extinguish the arc that might be drawn between the current carrying ends of the triggers should these ends be only separated by the normal gap between them, as shown in Fig. 11a. The dog 52b is made somewhat longer than the dog 52a, so that the increased gap is maintained, as shown in Fig. 11c, for an appreciable interval, thereby insuring complete extinguishment of any arc. When the dog 52b finally releases the tail portion 41a, the associated spring 95 for the trigger 41 returns the trigger to the normal position shown in Fig. 11d, in which the current carrying ends of the triggers 17 and 41 are separated only by a normal gap.

Obviously the above described operation of the current carrying triggers to prevent any arcing therebetween is not limited to the particular use of the triggers herein described, nor is it absolutely essential that this nonarcing arrangement be employed in connection with the triggers which control the energization of the shear solenoid. Furthermore, other minor changes and modifications may be made in our invention without departing from the spirit and scope thereof, which is set forth in the appended claims.

We claim:

1. The combination with conveying means for the progressive advancement of material to be sheared, of an intermittently operated shearing device for producing an initial crop cut and one or more subsequent dividing cuts on each piece of said material arriving thereat, and a control mechanism for said shear, rotatable in synchronism with said material-conveying means, and means for inaugurating the rotation of said mechanism, to control the shearing operations on each piece, simultaneously with the arrival of that piece at a predetermined point, thereby to procure equal-length crop cuts by said shear on successive pieces of material.

2. The combination with conveying means for the progressive advancement of material to be sheared, of an intermittently operated shearing device for producing an initial crop cut and one or more subsequent dividing cuts on each piece of said material arriving thereat, a control mechanism for said shear, rotatable in synchronism with said material-conveying means, means for arresting said control mechanism in a given angular position, following the last dividing cut taken by said shear on any piece, and means for inaugurating the rotation of said mechanism, to control the shearing operations on a following piece, simultaneously with the arrival of said following piece at a predetermined point.

3. In apparatus of the class described, the combination with a shear for operation on successively-arriving elongated pieces of moving material, of control mechanism for producing an initial crop cut and one or more subsequent dividing cuts of said shear on each piece said control mechanism comprising a pair of alternately-movable measuring members, both held stationary normally, with one in an intermediate position, means responsive to the arrival of a moving piece at a predetermined point for releasing the last-named of said measuring members, whose movement through a predetermined distance produces said initial crop cut of said shear, means for thereafter releasing said measuring members alternately, for equal predetermined movements to produce the dividing cuts of said shear, and means responsive to passage of said piece beyond said predetermined point for stopping the then-moving measuring member in said intermediate position, whereby to produce the same length of initial crop cut, when said control mechanism is set in operation by the arrival of a following piece of moving material at said predetermined point.

4. In apparatus for measuring and cutting moving material, the combination with means for conveying material, a cutting device and a shaft rotatably driven in unison with said material conveying means with a predetermined speed relation therebetween, of a measuring disk adapted to be frictionally driven by said shaft, a stop for preventing rotation of said disk with said shaft, a trigger device located in the path of movement of said disk for controlling said cutting device, and means actuated by the arrival of said material at a given point for disengaging said stop from said disk to permit the disk to rotate with said shaft, whereby said trigger device will be engaged by said disk to operate said cutting device after a predetermined length of said material has passed beyond said cutting device.

5. In apparatus for measuring and cutting moving material, the combination with means for conveying material, a cutting device and a shaft rotatably driven in unison with said material conveying means with a predetermined speed relation therebetween, of a measuring disk adapted to be frictionally driven with said shaft, a stop for preventing rotation of said disk with said shaft, electric current carrying triggers disposed in the path of movement of said disk for controlling said cutting device, and electromagnetic means controlled by the arrival of said material at a given point for disengaging said stop from said disk and permitting it to rotate with said shaft until said disk closes said triggers to cause the severance of said material by said cutting device.

6. In apparatus for measuring and cutting moving material, the combination with means for conveying material, a cutting device and a shaft rotatably driven in unison with said material conveying means with a predetermined speed relation therebetween, of a measuring disk adapted to be frictionally driven with said shaft, a stop for preventing rotation of said disk with said shaft, electric current carrying triggers disposed in the path of movement of said disk for controlling said cutting device, and electromagnetic means controlled by the arrival of said material at a given point for disengaging said stop from said disk and permitting it to rotate with said shaft until said disk closes said triggers to cause the severance of said material by said cutting device, the angular displacement between said stop and said triggers being adjustable to vary the lengths of the pieces of material severed by said cutting device.

7. In apparatus for measuring and cutting moving material, the combination with means for conveying material, a cutting device and a shaft rotatably driven in unison with said material conveying means with a predetermined speed relation therebetween, of a pair of measuring disks adapted to be frictionally driven with said shaft, stops for preventing rotation of either of said disks with said shaft, triggers disposed in the path of movement of said disks for operating said cutting device, and means controlled by the arrival of said material at a given point for moving one of said stops to permit the corresponding disk to rotate with said shaft while the other disk remains stationary, whereby engagement of one of said triggers by the moving disk causes the operation of the cutting device and the disengagement of another stop from the second disk to permit it to turn with said shaft to cause a second operation of the cutting device after a predetermined length of material has passed beyond the same.

8. In apparatus of the class described, a shear for making an initial crop cut and one or more subsequent equal-length dividing cuts on successively-arriving elongated pieces of moving material, in combination with control mechanism for said shear comprising a rotating shaft whose speed is synchronized to the speed of said material, a measuring member on said shaft adapted to rotate therewith when unopposed, a stop for preventing rotation of said member with said shaft, means set in operation by the arrival of a piece of material at a predetermined point for shifting said stop, to permit rotation of said measuring member with said shaft, and means responsive to such rotation of said member through a predetermined angle for producing said initial crop cut of said shear on said piece.

9. In apparatus of the class described, a shear for making an initial crop cut and one or more subsequent equal-length dividing cuts on successively-arriving elongated pieces of moving material, in combination with control mechanism for said shear comprising a rotating shaft whose speed is synchronized to the speed of said material, a pair of measuring members on said shaft, adapted to rotate therewith when unopposed, stops for each of said measuring members, for normally preventing their rotation with said shaft, means set in operation by the arrival of a piece of material at a predetermined point for shifting the stop of one or the other of said measuring members, thereby to permit the latter's rotation with said shaft through a predetermined angle, to produce the initial crop cut of said shear on said piece, and means effective during the movement of said piece past said predetermined point for thereafter releasing said measuring members alternately, to produce by their equal angular movements a series of dividing cuts of said shear on said piece.

10. In apparatus of the class described, a shear for making an initial crop cut and one or more subsequent equal-length dividing cuts on successively-arriving elongated pieces of moving material, in combination with control mechanism for said shear comprising a pair of movable measuring members, means for normally holding said members stationary, means responsive to the arrival of a piece of material at a predetermined point for releasing one or the other of said members and procuring its movement through a predetermined distance to effect said initial crop cut of said shear on said piece, means set in operation by said first-moving member for releasing the other member for movement through a predetermined distance to effect a dividing cut of said shear on said piece, and means for procuring during the movement of said piece past said predetermined point the alternate movements of said measuring members to effect successive dividing cuts, equal in length with said first-mentioned dividing cut, of said shear on said piece.

11. In apparatus of the class described, a shear for making an initial crop cut and one or more subsequent dividing cuts on successively-arriving elongated pieces of moving material, in combination with control mechanism for said shear comprising a pair of co-operating normally stationary measuring members, one or the other of which is set in motion from an intermediate starting position by the arrival of a piece of material at a predetermined point, means responsive to a predetermined movement of the member so set in motion for procuring the initial crop cut of said shear on said piece, means for thereafter alternately releasing said measuring members, each by movement of the other, for predetermined equal movements, in the passage of said piece of material through the shear, to effect by such movements the dividing cuts of said shear on said piece, and means operative after the last dividing cut on said piece for bringing the then-moving measuring member to rest in a position corresponding to said intermediate starting position.

12. In apparatus of the class described, the combination with a shear for operation on successively-arriving elongated pieces of moving material, of rotary control mechanism for said shear, set in operation by the arrival of a moving piece at a predetermined point, means responsive to initial predetermined angular movement of said control mechanism for operating said shear to crop the front end of said piece, means responsive to further rotation of said control mechanism for producing a succession of equal-length dividing cuts of said shear on said piece, and means actuated by the passage of said piece beyond said predetermined point for stopping said control mechanism in an angular position corresponding to that which it occupied at the start of its rotation, whereby, on the next arriving piece of material, the crop cut and the dividing cuts of said shear will be of the same lengths as the corresponding cuts taken on the preceding piece.

13. In apparatus of the class described, the combination with a shear for operation on successively-arriving elongated pieces of moving material, of shear-control mechanism, set in operation from a rest position by the arrival of a moving piece at a predetermined point, means responsive to a predetermined initial operation of said control mechanism for producing a front end crop cut of said shear on said piece, means responsive to further operation of said control mechanism for producing a succession of equal-length dividing cuts of said shear on said piece, and means actuated by the passage of said piece beyond said predetermined point for stopping said control mechanism in a position corresponding to said original rest position, whereby, upon its resumption of operation with the arrival of a following piece at said predetermined point, the crop cut of said shear on said following piece corresponds in length to the crop cut taken on the preceding piece.

14. In apparatus of the class described, the combination with a shear for operation on successively-arriving elongated pieces of moving material, of shear control mechanism adapted, when unopposed, to rotate in synchronism with the speed of said material, a stop normally preventing rotation of said control mechanism, means responsive to the arrival of a piece of material at a predetermined point for shifting said stop, to permit rotation of said control mechanism, means responsive to initial predetermined angular displacement of said mechanism for producing a front end crop cut of said shear on said piece, means responsive to further rotation of said mechanism for producing successive equal-length dividing cuts of said shear on said piece, and means actuated by the passage of said piece beyond said predetermined point for restoring said stop to its operative position, whereby the rotation of said mechanism is arrested, when it arrives at an angular position corresponding to that from which it was started.

15. In apparatus of the class described, the combination with a shear for operation on successively-arriving elongated pieces of moving material of shear-control mechanism comprising a pair of alternately-operated members, rotatable in step with the travel of said material, for producing by their predetermined angular movements an initial crop cut and one or more subsequent dividing cuts of said shear on each piece, means operative after the last dividing cut on any piece for stopping one of said members in a predetermined intermediate angular position, thereby to reset said control mechanism for the same length of crop cut on a following piece, and means for overlapping the alternate rotary movements of said members, thereby to increase the time required for said resetting operation.

16. In apparatus of the class described, the combination with a shear for operation on successively-arriving elongated pieces of moving material, of shear-control mechanism comprising a pair of members, rotatable in step with the movement of the material, for producing by their alternating angular movements, a cropping operation and a succession of dividing operations of said shear on each piece, a stop made operative by the passage of a piece beyond a predetermined point for arresting one of said members in an intermediate angular position, thereby to reset said control mechanism for the cropping operation on the next piece, and means for inaugurating every periodic angular movement of each member during the previously-inaugurated periodic angular movement of the other member, whereby to advance the instant of operation of said stop.

17. In apparatus of the class described, the combination with a shear for operation on successively-arriving elongated pieces of material, of shear-control mechanism rotatable in step with the travel of said material for producing an initial crop cut and one or more subsequent dividing cuts of said shear on each piece, and means for adjusting said mechanism to vary, independently, the crop lengths and the dividing lengths cut by said shear, without changing the speed of rotation of said mechanism.

18. In apparatus for shearing metal bars while in motion, the combination with a shearing device and means for conveying metal bars to said shearing device, of a pair of measuring devices, either adapted to be set in operation by movement of a bar towards said shearing device for jointly controlling the operation of said shearing device during the passage therethrough of a single bar, said measuring devices operating alternately to produce the successive cuts of said shearing device on said bar.

19. In apparatus for shearing metal bars while in motion, the combination with a shearing device and means for conveying metal bars to said shearing device, of a pair of measuring devices adapted to be driven in synchronism with said metal conveying means for jointly controlling said shearing device during the passage therethrough of any bar, and means actuated by the front end of each bar in its movement to the shearing device for causing the alternate operation of said measuring devices to produce the successive cuts of said shearing device.

20. In apparatus for shearing metal bars while in motion, the combination with a shearing device, means for conveying a bar to said shearing device, an electro-magnet for operating said shearing device and a source of electrical energy, of a pair of measuring devices each adapted to produce the energization of said magnet from said source to operate said shearing device, and means controlled by the movement of bars to said shearing device for causing the energization of said magnet to be controlled first by one measuring device and then by the other.

21. In apparatus of the class described, the combination with a shear for the division of successively-arriving pieces of moving material, of control means for said shear, comprising a pair of members whose alternate revolutions produce the successive cuts of said shear, either of said members being set in operation by the arrival of a piece of said material at a predetermined point.

22. In apparatus of the class described, the combination with a shear for the cropping and division of successively arriving pieces of moving material, of control means for said shear, comprising a pair of rotatable members, either of which is adapted to be set in operation by the arrival of a piece of said material at a predetermined point, means for imparting alternate single revolutions to said members, and means for producing, by each revolution of either member, an operating cut of said shear.

Dated this ninth day of May, 1927.
JOHN W. SHEPERDSON.
FRANK P. DAHLSTROM.